US006980742B1

(12) United States Patent
Lidén et al.

(10) Patent No.: US 6,980,742 B1
(45) Date of Patent: Dec. 27, 2005

(54) WAVELENGTH CONTROL IN OPTICAL WDM SYSTEMS

(75) Inventors: Fredrik Lidén, Norsborg (SE); Magnus Öberg, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/762,996

(22) PCT Filed: Aug. 3, 1999

(86) PCT No.: PCT/EP99/05630

§ 371 (c)(1),
(2), (4) Date: Jul. 13, 2001

(87) PCT Pub. No.: WO00/10271

PCT Pub. Date: Feb. 24, 2000

(30) Foreign Application Priority Data

Aug. 14, 1998 (EP) .................................. 98115369

(51) Int. Cl.[7] .......................... H04J 14/02; H04B 10/12
(52) U.S. Cl. ........................... 398/85; 398/79; 398/95; 398/149
(58) Field of Search .............................. 398/79, 85, 95, 398/149; 385/24

(56) References Cited

U.S. PATENT DOCUMENTS

| 5,673,129 A | 9/1997 | Mizrahi | ..................... 359/124 |
| 5,793,910 A | 8/1998 | Derr | ............................. 385/24 |

FOREIGN PATENT DOCUMENTS

| JP | 07 095159 A | 4/1995 | |
| JP | 07 162070 A | 6/1995 | |
| JP | 09-093223 | * 4/1997 | ........... H04J 14/00 |
| JP | 09 093223 A | 4/1997 | |

OTHER PUBLICATIONS

International Search Report relating to PCT/EP99/05630; Dated: Oct. 25, 2000.
Written Opinion relating to PCT/EP99/05630; Dated: May 9, 2000.
European Search Report relating to Priority Application EP 98115 369.5 for PCT/EP99/05630; Dated: Dec. 18, 1998.

* cited by examiner

*Primary Examiner*—M. R. Sedighian
(74) *Attorney, Agent, or Firm*—Roger Burleigh

(57) ABSTRACT

Wavelength drift in an optical WDM system between wavelengths launched by lasers (110) and received at a demultiplexer (50) can lead to disturbance of traffic signals if not identified and rectified rapidly. It is proposed to identify wavelength drift by determining a difference in temperature of the demultiplexer (50) for each channel between an actual temperature and a temperature for optimal transmission of the channel. The mean of these temperature differences for all channels is indicative of wavelength drift, while each difference is utilised to determine whether an individual channel is drifting in wavelength and to correct the drift. Wavelength drift can be detected and corrected whether sourced at a laser (110) or due to a temperature variation at the demultiplexer (50). Measurement and control can be performed during normal operation without impeding or degrading traffic flow. Wavelength influencing parameters other than temperature can be utilized.

23 Claims, 4 Drawing Sheets

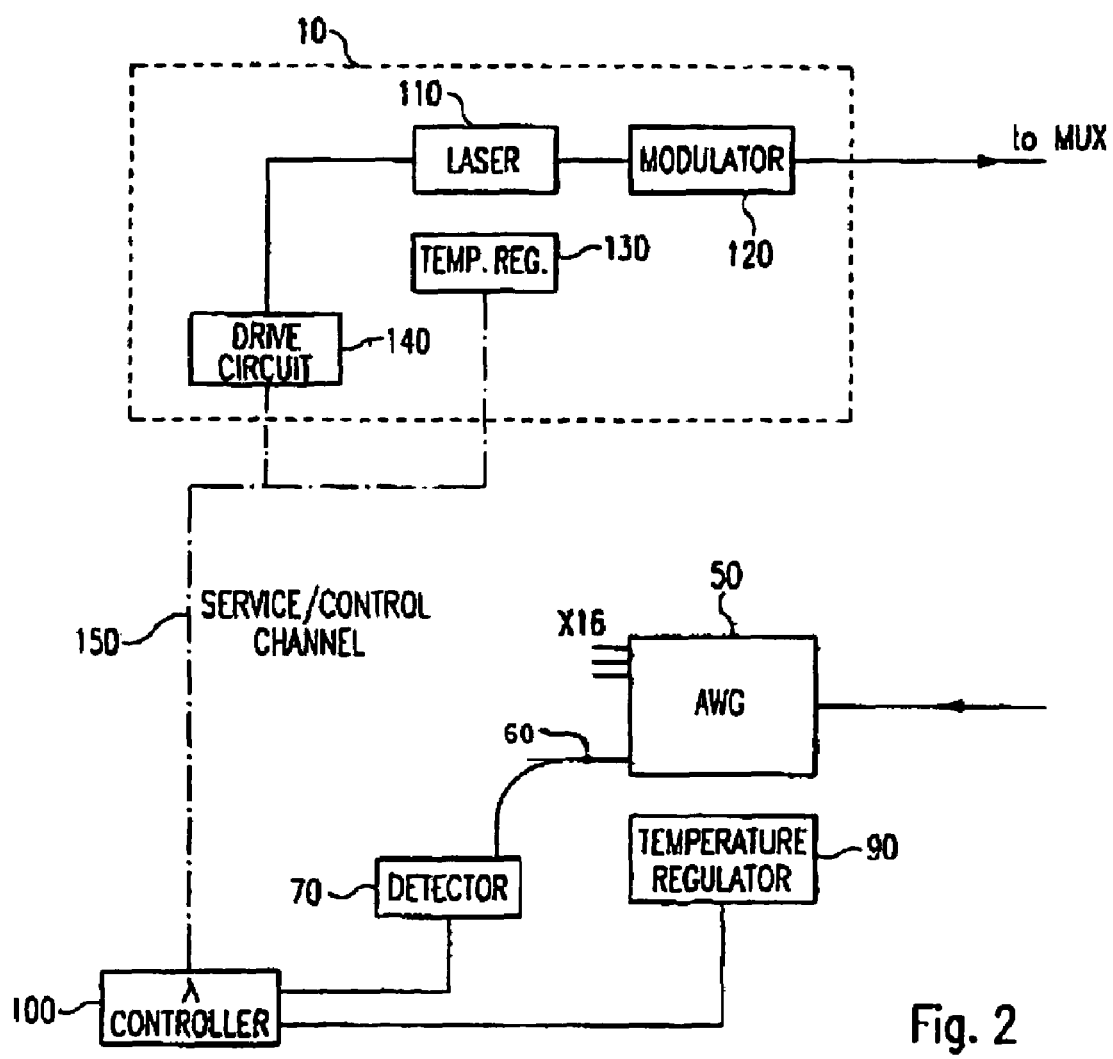
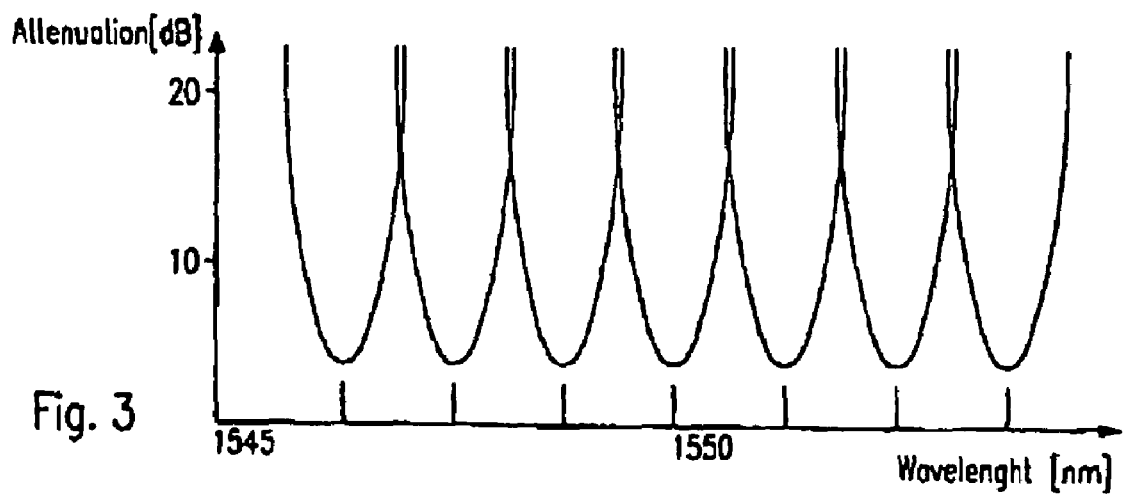
Fig. 2
Fig. 3

WAVELENGTH CONTROL IN OPTICAL WDM SYSTEMS

FIELD OF THE INVENTION

The invention relates to wavelength division multiplexed optical communication systems and, in particular, to the measurement and control of wavelengths transmitted by an optical transmission source and received by an optical wavelength selective element.

BACKGROUND ART

In wavelength division multiplexed (WDM) optical communication systems, a single fibre optic cable carries a plurality of optical signal channels, each channel being assigned a particular carrier wavelength. The signal channels are generated using wavelength specific lasers. These channels are then coupled to the traffic fibre using an optical combiner or multiplexer and sent to the next node in the system, possibly via a number of optical amplifiers. At the receiving node, the different wavelengths are filtered out in a demultiplexer and are sent to a respective receiver where they are converted to electrical signals and relayed to further systems or networks.

In the demultiplexer, individual optical channels must be selected from the multiplexed optical signal. To ensure that an optical signal is properly selected, the carrier wavelength launched by the laser transmitter must accurately match the wavelength selected in the demultiplexer. Although the lasers are generally very stable in terms of wavelength, erroneous operation can lead to wavelength drift in an individual channel over time. Similarly, the wavelengths of the demultiplexer passbands can drift. It is important that this wavelength drift is detected and corrected before the channel has deteriorated so much that traffic is disturbed in the channel itself as a result of attenuation, and in neighbouring channels by crosstalk. This is particularly important for dense WDM systems wherein the wavelength spacing between channels is very small, often of the order of a nanometer.

A technique for dynamically stabilising a wavelength selective element in a WDM system is described in U.S. Pat. No. 5,673,129. This document describes that a wavelength reference is used to stabilise the output wavelength of a transmission laser while the reflection wavelength of a Bragg grating used as a wavelength selective element at the receiving end of the system is dynamically adjusted to obtain the maximum reflected optical signal and so accurately correlate the Bragg grating to the corresponding transmitted wavelength. The adjustment of the Bragg grating reflection wavelength is obtained by temperature tuning or adjustment of the amount of physical tension applied to the Bragg grating.

While this arrangement ensures the accurate correlation of the wavelength selective element to the transmitted wavelength, an extreme drift in wavelength in an individual laser will not be corrected and could ultimately lead to crosstalk between adjacent channels. Furthermore, the need for a wavelength reference for each laser necessitates the provision of a relatively large number of potentially costly components.

In an alternative embodiment described in the same patent, the temperature of the Bragg grating is held constant and the signal reflected at the grating is fed back to the transmitting laser and used to dynamically tune the laser to the reflected wavelength by adjustment of the laser temperature. However, the provision of a stable temperature environment for the Bragg grating without recourse to adjustment on the basis of variations in the reflected wavelength is difficult to implement and is dependent on the reliability of normally electrical heating and cooling elements.

In the light of the disadvantages associated with the prior art it is an object of the present invention to provide an arrangement and procedure for controlling the wavelengths of channels in an optical WDM system which is reliable, simple and inexpensive in its implementation.

SUMMARY OF THE INVENTION

To control the wavelengths of channels transmitted by one or more optical sources and received by a wavelength selective element, the present invention proposes a method wherein at the receiving end a value of a wavelength influencing parameter of the wavelength selective element that enables the best reception of the channel is determined. This value is then utilised to ascertain whether the wavelengths used in the link have drifted. This parameter value associated with the channel centre wavelength is accurately located by determining two parameter values at which the output power drops by a predetermined amount, and then calculating the central value. When the parameter values are difference values relative to a nominal starting value, the mean averaged over all channels serves as an indicator of wavelength drift in the link. By determining the proportion of channels demonstrating wavelength drift, both the source and magnitude of the wavelength drift can be ascertained and corrected either by adjusting the parameter value of the wavelength selective element or by adjusting the wavelength launched by one or more lasers. A wavelength control arrangement for use in an optical WDM link according to the invention is characterised by control means that communicate with a parameter regulator of the wavelength selective element that is adapted to regulate a wavelength influencing parameter and with means that monitor the output power of the wavelength selective element. The control means are furthermore coupled to a regulator adapted to regulate a wavelength influencing parameter of a laser and laser drive circuit and are adapted to determine the magnitude and source of a wavelength error and subsequently control one or both of the wavelengths launched by the lasers and the wavelengths received by the wavelength selective element.

Advantageously, the method and arrangement according to the present invention permit wavelength drift to be both detected and corrected whether caused by one or more malfunctioning lasers or by the wavelength selective element when the parameter utilised is temperature, wavelength drift at the wavelength selective element could, for example, result from the deterioration of associated electrical temperature regulating elements. Furthermore, the method obviates the need for permanent wavelength references at the optical sources or lasers, but nevertheless permits wavelength drift to be determined and corrected with high precision. The control measurement can be performed entirely at the receiving end of the link without impeding or degrading normal traffic flow. A further advantage of the method and arrangement according to the present invention is that the division of the channels received by the wavelength selective element does not need to precisely match the transmitted wavelengths. The best average power for all channels can be defined and maintained using the method and arrangement according to the invention.

BRIEF DESCRIPTION OF THE DRAWINGS

Further objects and advantages of the present invention will become apparent from the following description which describes the preferred embodiments by way of example with reference to the accompanying drawings in which:

FIG. 3 shows the typical transmission characteristics of an arrayed waveguide grating utilised as a demultiplexer filter.

DETAILED DESCRIPTION OF THE DRAWINGS

Figure 1:
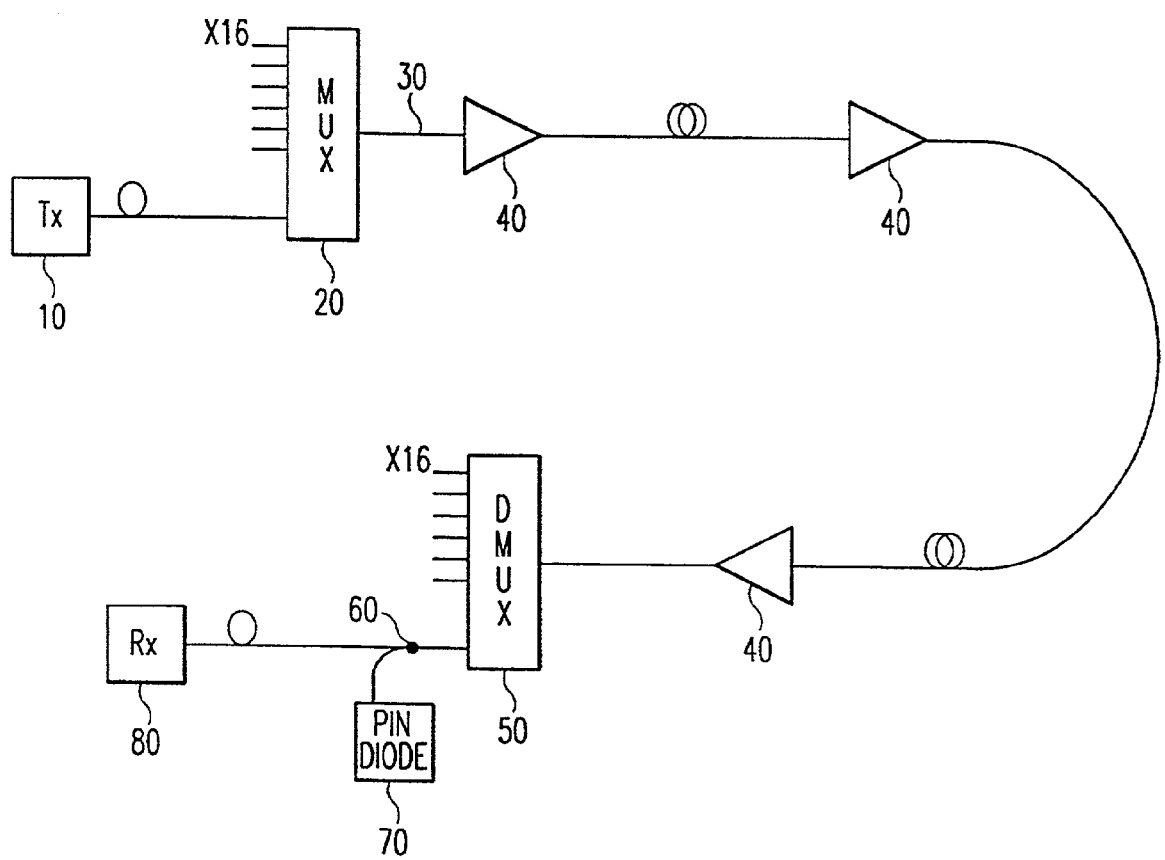
FIG. 1 schematically depicts a 16 channel optical wavelength division multiplexed system, FIG. 2 schematically shows the control system for controlling matching of wavelength between the transmitting optical sources and the demultiplexer filter.

The WDM link depicted in FIG. 1 includes a plurality of WDM transmitters 10, each adapted to transmit data signals modulated on a specific transmission wavelength. The transmitters 10 each comprise a wavelength specific laser 110 (see FIG. 2) for launching the carrier wavelength. The multiple channels are coupled to a traffic cable 30 by a multiplexer 20 and are sent to the receiving node possibly via a number of amplifiers 40 if the distance between the nodes is large.

At the receiving node, the channels are split by a demultiplexer filter 50. In the exemplary embodiment the demultiplexer filter is an arrayed waveguide grating (AWG) in silicon dioxide on silicon ($SiO_2$ on Si), however it will be understood that other materials and also alternative wavelength selective elements may be employed. The divided channels are then passed on individual cables to corresponding WDM receivers 80, of which only one is illustrated here for convenience.

The light signals of the individual channels output from the demultiplexer filter 50 are also monitored using detectors 70. One detector 70 only is illustrated in the figure for clarity, however, it will be understood that a detector 70 will typically be coupled to each outgoing channel. Alternatively, a single detector could monitor the light signals from all outgoing channels in sequence. The detectors 70 can be any optical detector that converts an optical signal into electrical energy such as a PIN diode detector, and are typically coupled to the optical transmission line using optical taps 60 that divert a small portion of the incident power towards the associated detector 70.

The components of the wavelength control system are shown in FIG. 2. In this figure like reference numerals have be used for like elements shown in FIG. 1. The elements include, at the receiving end of the optical link shown in the lower half of FIG. 2, the demultiplexer filter constituted by an arrayed waveguide grating (AWG) filter 50, the detectors 70 coupled to each outgoing channel of the AWG filter 50 by a respective optical tap 60 (here again only one detector 70 and fibre tap 60 are illustrated for convenience), a temperature regulator 90 associated with the demultiplexer filter 50 and a wavelength controller 100. The temperature regulator 90 is a device for varying the temperature of the AWG filter 50 and may comprise a heater, a cooler or a combination of the two, including, but not limited to, resistive heaters and thermoelectric coolers.

The wavelength controller 100, which typically may comprise a microprocessor with associated memory, is coupled to the output of the detectors 70 and the temperature regulator 90. The controller 100 is likewise coupled to each transmitter 10 of the optical link, only one of which is illustrated here, via a service or control channel 150 indicated by a dashed-dotted line in FIG. 2. In each transmitter 10, the controller 100 communicates with a laser drive circuit 140, which supplies bias current to a laser 110 and with a laser temperature regulator 130. The laser is typically a distributed feedback laser (DFB) although it will be understood that other types of laser can also be utilised. The laser temperature regulator incorporates a thermal/cooling element, such as a Peltier element or the like, for varying the temperature of the laser and accordingly adjusting the emitted wavelength. In alternative laser types the emitted wavelength may be controlled by adjusting electrical current to the laser or by the mechanical movement of optical elements, for example to increase or reduce strain. It will therefore to be understood that appropriate means of adjustment can be provided to an alternative laser in place of the arrangement described with reference to the figures. The transmitter 10 further includes a modulator 120 for modulating information data on the carrier signal.

It should be noted that while in FIG. 2 the controller 100 is shown disposed at the receiving end of the optical link it may also be placed at the transmitting end, in which case it would communicate with the detectors 70 and the temperature regulator 90 at the receiving end via the service channel 150. Alternatively the controller 100 may be located remote from both ends of the link.

A typical transmission characteristic of a demultiplexer filter 20 suitable for use in an optical WDM link is shown in FIG. 3. In the example shown, the passband wavelengths correspond to the International Telecommunications Union (ITU) standard wavelengths defined in the 1500 nm telecoms window. It is possible to adjust the passband wavelengths of the filter 20 by varying the demultiplexer temperature. For an AWG filter in $SiO_2$ on Si, the variation in passband wavelength is of the order of 0.012 nm per degree Celsius. Since the transmission of the demultiplexer is wavelength dependent, the signal power to each detector 70 will vary with the temperature of the demultiplexer. It is possible to determine the temperature accurately, and in this way to indirectly measure the wavelengths of the incoming channels relative to one another. Specifically, the centre wavelength of a transmitted channel is ascertained by determining the temperature of the demultiplexer filter 50 at which this wavelength is transmitted. In this manner both wavelength drift of one or more individual channels and temperature variation in the demultiplexer can be detected accurately.

While the embodiment shown in the figures and described above is applied to the case wherein the passband wavelengths of the demultiplexer filter 50 vary with temperature, it will be understood that other demultiplexer filters may be utilized which have a passband wavelength dependent on other parameters, including, but not limited to electrical injection current or mechanical movement of optical elements. With such a device the determination and measurement of wavelength drift will be achieved by varying the appropriate wavelength influencing parameter of the demultiplexer filter 50. Accordingly the temperature regulator 90 of the demultiplexer filter 50 will be replaced, or supplemented by an appropriate regulator or regulators for varying the parameter of interest. A similar parameter regulator can be employed at the transmitter 10 for adjusting the wavelength of the laser in place of, or in addition to the temperature regulator 130.

The method for controlling wavelength using temperature adjustment is described below. It should be noted that for devices with wavelength influencing parameters other than temperature an analogous method could be used.

Prior to operating the link the lasers are first adjusted to the desired nominal wavelengths. In an optical WDM network the nominal wavelengths preferably conform to the ITU standard for the 1500 nm telecoms window. The adjustment is effected using a well calibrated external measuring instrument such as an optical wavelength meter or the like. Since the division of the demultiplexer filter 50 channels may not exactly match the predetermined nominal wavelengths, it may not be possible to obtain maximum power for all channels at the demultiplexer filter 50. To adjust for this eventuality, the feedback loop constituted by the controller 100, the temperature regulator 90 and the detectors 70 is used to set the temperature of the demultiplexer filter 50 to obtain the optimal mean output power from all utilised channels. To this end, the controller 100 performs an appropriate step algorithm which adjusts the temperature of the wavelength selective element until the mean output power from all channels is optimised. Note that the mean output power need not be the median of the individual output powers, but could be weighted to ensure that no individual channel falls below a predetermined threshold level. It should be noted that in the following method the number of channels is indicated by n. In the embodiment illustrated in FIGS. 1 and 2, therefore, n goes from 1 to 16.

Once both the nominal wavelengths and the initial temperature have been defined and fixed, the controller 100 calculates the initial variance (IVn) for each channel. This value corresponds to the difference between the temperature of the selective element when it transmits the optimum mean power of all channels and its temperature when it transmits a single channel optimally. The initial variance value (IVn) for each channel is obtained using the procedure A illustrated in FIG. 4. In step 401 the starting temperature of the wavelength selective element, which in this case is the temperature for optimal average transmission of all nominal wavelengths, and the power level of each channel is stored. The starting temperature may be an absolute temperature value, but it is preferable that this temperature be set to a nominal value, e.g. 0. The temperature of the demultiplexer filter 50 is incremented in step 402. In step 403 the power level of each channel at the output of the demultiplexer filter 50 is compared with the initial output power. If it has fallen below 0.5 dB, the temperature is stored (step 405) if not, the method returns to step 402 and the temperature of the demultiplexer filter 50 is incremented again. This continues until the power levels of all channels have fallen below the 0.5 dB level and the corresponding temperatures of the demultiplexer 50 is stored. In practice the stored temperatures will be quantized values corresponding to the number of temperature increments. The demultiplexer filter 50 is then returned to the starting temperature in step 405. In step 406, the temperature of the demultiplexer filter 50 is decremented. In step 407 the output power level of each channel is measured and compared with the initial power level to determine whether it has dropped by 0.5 dB. If not, the method returns to step 406, otherwise, the corresponding temperature is stored. This continues until two temperature values (DHn and DLn) corresponding to the −0.5 dB power levels have been determined for all channels. The mean IVn of these two values (DHn, DLn) for each channel computed in step 409 then corresponds to the difference in temperature of the demultiplexer filter 50 for transmitting the mean optimal power of all channels and the optimal power of the channel in question when the channels are tuned to the predetermined nominal wavelengths. By inference, this mean variance value IVn likewise corresponds to the initial wavelength error for each channel. The mean value IVn is then stored for each channel in the controller 100 for use in the subsequent wavelength checks.

When the temperature values (DHn, DLn) are difference values relative to the starting temperature, then, providing the centre wavelength of the filter 50 lies within the 0.5 dB levels of the actual launched channel, one value DHn will be positive and the other DLn negative. Accordingly if the launched centre wavelength is exactly equal to the centre filter wavelength, the initial variance value IVn will be zero. Note that since the temperature of the demultiplexer filter 50 has been adjusted for optimal average output power for all channels, the mean of these variance values IVn for all channels will be zero at this stage.

The initial starting temperature of the demultiplexer 50 determined as described above is the ideal operating temperature and is consequently maintained using conventional electrical thermal and cooling elements and a suitable control circuit which is not shown. With time, however, these electrical elements may deteriorate, causing the real temperature of the demultiplexer filter 50 to vary and hence the passbands of the filter 50 to shift in wavelength. Errors leading to drift in wavelength may also arise in individual lasers 110.

Figure 4:
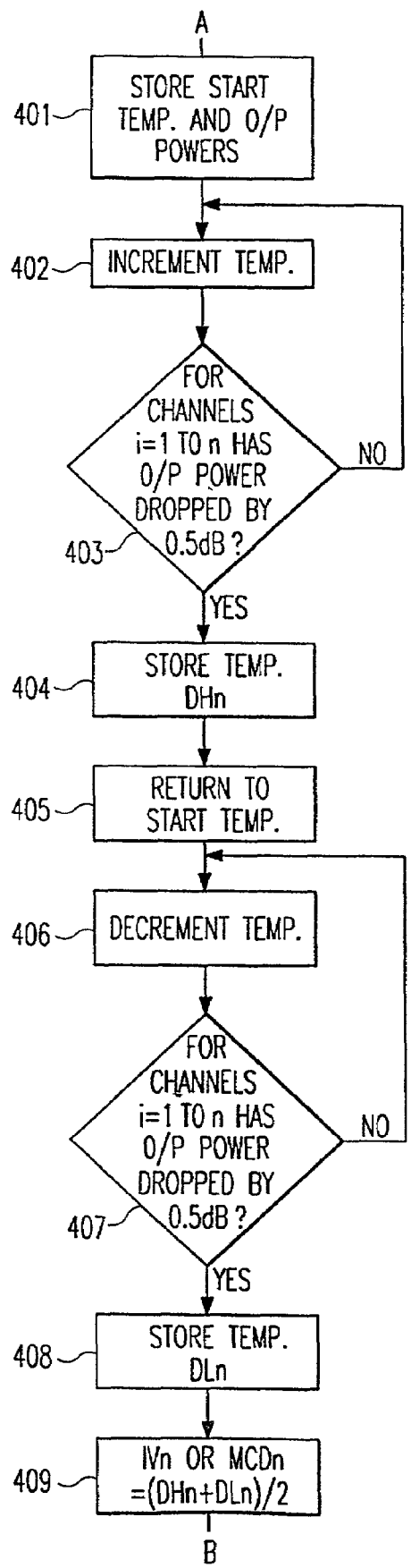
FIGS. 4 and 5 show flow diagrams of the procedure for determining and correcting wavelength shift between optical source lasers and the demultiplexer filter.
Figure 5:
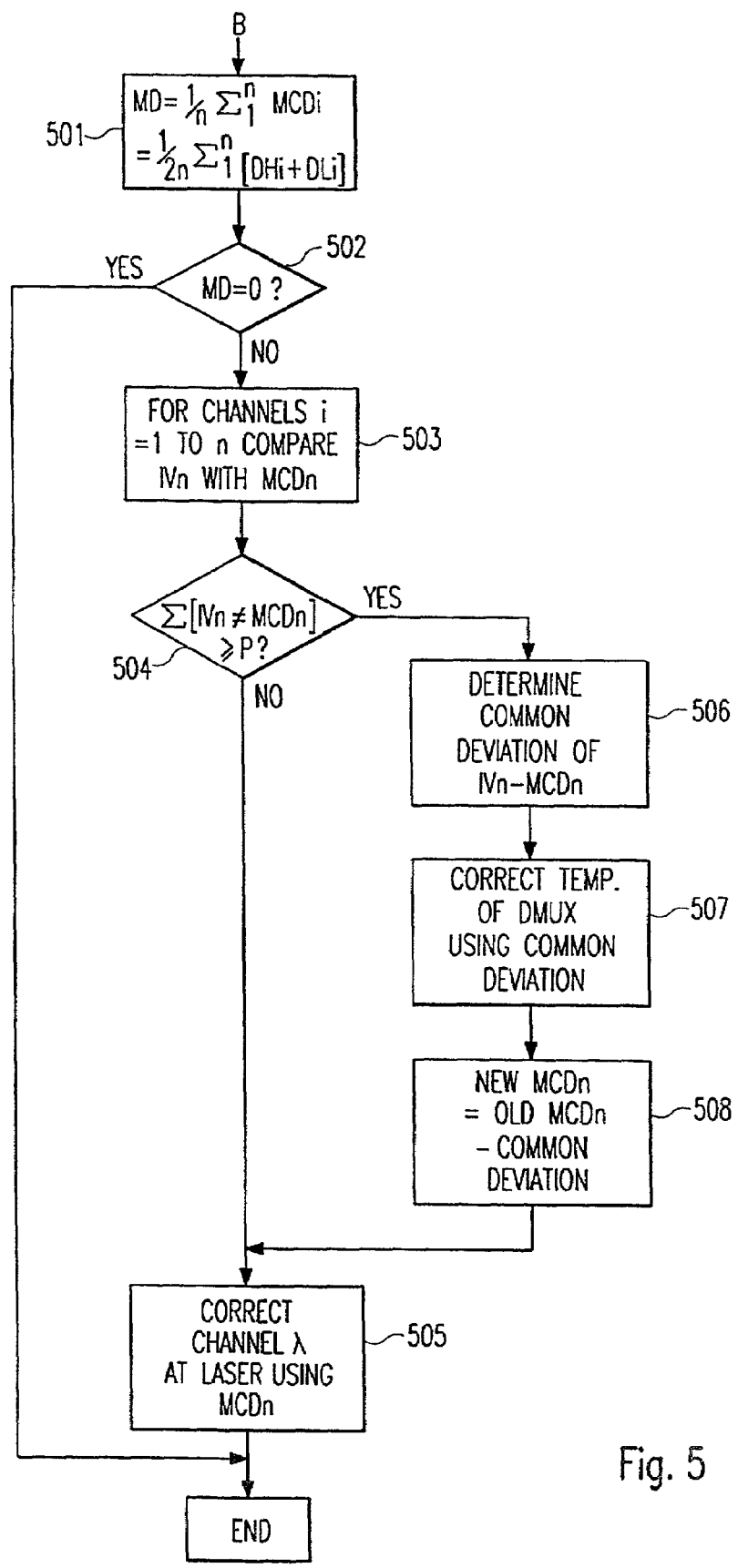

Hence, during operation of the optical WDM link the correlation between the launched wavelengths and the wavelengths transmitted through the demultiplexer filter 50 is checked at regular intervals using the procedures laid out in FIGS. 4 and 5. Firstly, steps 401 to 409 of procedure A are followed as described above with, in this case, the starting temperature being the actual temperature of the demultiplexer filter 50 at the time of measurement, and the mean of the difference values DHn and DLn being a channel mean value MCDn, i.e. the mean of the difference values DHn and DLn for each channel relative to the actual temperature. The method then goes on to procedure B shown in FIG. 5. In step 501 the average MD of all channel mean values MCDn is calculated. This average value is computed on the same basis as the initial average output power of all channels and accordingly may be weighted if the initial distribution of channel wavelengths in the AWG filter rendered this necessary. Accordingly if no wavelength drift has occurred on the link, i.e. if the wavelengths launched by the lasers 110 and the temperature of the demultiplexer filter 50 are unchanged, the average mean MD will be zero. In this case the comparison in step 502 results in an answer YES and the procedure is terminated. However, if this value is not equal to zero, wavelength drift must have occurred, as a result of an error either in one or more lasers or the temperature regulation of the demultiplexer filter 50, or a combination of both of these. The procedure then continues in step 503, where for each channel the initial variance value IVn is compared with the determined mean value MCDn. This step determines the number of individual channels whose wavelength has varied with respect to the initial value. The sum of these comparison results which deviate from zero is then compared with a predetermined value P in step 504 to determine the proportion of channels which have varied with respect to the initial settings. Since it is unlikely that all lasers 110 will fail simultaneously, a majority of deviating channel wavelengths will indicate that the temperature of the demultiplexer filter 50 has altered. Accordingly, The value P is selected to represent a failure in the majority of the channels used, or at least in the proportion of the used channels which statistically are unlikely to fail simultaneously. It may not be necessary to perform the comparison of step 503 for all channels. If at least a predetermined number of comparisons is performed, this will enable the accurate determination of how widespread any wavelength drift is, and accordingly give an indication as to whether the temperature of the lasers 110, the demultiplexer filter 50 or both need adjusting to correct the wavelength.

If fewer channels than P have drifted from the initial wavelengths, then the method turns to step 505 where, for each channel, the channel mean values MCDn are used to correct the wavelengths launched by the corresponding lasers 110, preferably by altering the temperature using the regulator 130. Conversely, if the result of the comparison in step 504 is YES, the method continues to step 506 where the common deviation of the channels is determined. This value is then used in step 507 to correct the temperature of the demultiplexer filter 50. Once the error caused by the demultiplexer filter 50 has been corrected, the channel mean values MCDn are corrected in step 508 by subtracting the common value determined in step 506. The corrected MCDn values are then used in step 505 to correct the wavelengths launched by the lasers, if necessary.

This procedure can, for example, be performed once every month since it is primarily adapted to detect long variations in wavelength. The procedure can also be carried out during normal traffic operation without deterioration of payload traffic. To this end, the temperature increments used in method A in FIG. 4 are selected to obtain a reasonable variation in wavelength of the light signals transmitted by the demultiplexer filter without unduly attenuating the received signals or provoking crosstalk in adjacent channels. For example, for an AWG demultiplexer filter in $SiO_2$ on Silicon, increments of 1° C. resulting in a stepwise variation in transmitted wavelength of 0.012 nm is acceptable. It should further be noted that the output power reduction of 0.5 dB is also given only by way of example. This value is similarly chosen to permit accurate but easily measurable wavelength variations without disturbance to traffic by attenuation or crosstalk.

In an alternative embodiment of the invention steps 503 and 504 in the method B of FIG. 5 are replaced by a single step wherein the mean variation for all channels MD is compared with a predetermined fixed value. This value is selected according to the number of channels utilised and relies on the fact that a wavelength drift due to a variation in temperature of the demultiplexer filter 50 will result in a total mean variation n times as large as the same drift in a single laser when n channels are used. Since it is highly improbable that one or more lasers will vary in wavelength to a degree which results in the same mean value, or that their wavelengths vary to an extent that cancels out a variation caused by the demultiplexer filter temperature, a predetermined fixed value can be selected to provide a reasonably accurate gauge as to the source of the wavelength drift.

In a further embodiment of the invention, the processing step 508 can be omitted and in its place the whole method starting from step 401 of procedure A be repeated. Since the drift caused by a temperature variation in the demultiplexer has been corrected, a repeat of the whole method will result in the correction of the wavelengths launched by the lasers, if necessary.

The aforementioned method is particularly well adapted for use in an optical WDM system where pre-defined wavelengths are used, however, it also has application in optical WDM point-to-point links where the standards laid down for wavelengths need not be respected. In such a point-to-point link, the method described with reference to FIG. 4 can be used to accurately match the wavelengths launched by the lasers 110 to the wavelength division of the demultiplexer filter 50 and so enable optimal transmission over all channels.

What is claimed is:

1. A method for controlling the wavelength of a plurality of channels launched by optical transmission means and received by at least one wavelength selective element in an optical WDM link, the method including:

noting a starting value of a wavelength influencing parameter of said wavelength selective element, for each channel, determining a channel centre value (MCDn) of said parameter of said wavelength selective element at which the output power of said channel is a maximum, calculating a mean value (MD) corresponding to the average of said channel centre values (MCDn) for all channels, and utilising said mean value (MD) to determine a deviation between said launched wavelengths and wavelengths selected by said wavelength selective element indicative of wavelength drift in said optical link, and to correct said wavelength deviation at at least one of said wavelength selective element and said optical transmission means.

2. Method as claimed in claim 1, wherein determining said channel centre values includes for each channel, determining a first parameter value (DHn) of said wavelength selective element relative to said starting parameter value at which the power of said channel output from said wavelength selective element falls below a predetermined level, for each channel, determining a second parameter value (DLn) of said wavelength selective optical element relative to said starting value at which the power of said channel output from said wavelength selective optical element falls below said predetermined level, and for each channel, determining a channel mean value (MCDn) corresponding to the average of said first and second parameter values.

3. A method as claimed in claim 2, wherein said first and second parameter values are difference values (DHn, DLn) relative to said starting value.

4. A method as claimed in claim 3, wherein said mean value (MD) is a weighted average of said first and second parameter values for all channels.

5. A method as claimed in claim 1, characterised in that said parameter is the temperature of said wavelength selective element.

6. A method as claimed in claim 1, characterised in that said parameter is an electrical injection current into said wavelength selective element.

7. A method as claimed in claim 1, characterised in that said parameter is a mechanical movement of an optical element associated with said wavelength selective element.

8. The method recited in claim 1, further comprising the steps of:

utilising said channel centre values to determine the proportion of channels which manifest a drift in wavelength relative to the total number of channels; and utilising said mean value (MD) to adjust a wavelength influencing parameter of said wavelength selective element when said proportion exceeds a predetermined amount.

9. The method recited in claim 8, further comprising the step of comparing, for each of at least a predetermined number of channels, said channel centre value (MCDn) with a predetermined channel variance value (Ivn) to obtain a difference value (Dn) indicative of a wavelength shift in said channel.

10. The method recited in claim 9, further comprising the step of determining the proportion of said channels which demonstrate a wavelength drift by summing the difference values (Dn) that deviate from zero for at least a predetermined number of channels.

11. The method recited in claim 10, further comprising the step of setting said predetermined channel variance value (IVn) as a difference between a) a value of said parameter of said wavelength selective element at which the output power of said channel having a predetermined nominal channel wavelength is optimised and b) a value of said parameter of said wavelength selective element at which the average output power of all channels having predetermined nominal wavelengths is optimised.

12. A method as claimed in claim 9, further including the steps of:
- prior to operation of said optical link, setting the wavelengths of optical transmission sources coupled to said optical transmission means to predetermined nominal wavelengths,
- setting said wavelength selective element to a nominal parameter value at which the output power of all said channels is optimised,
- for each channel, determining a first value of said parameter of said wavelength selective element relative to said nominal value at which the power of said channel output from said wavelength selective element falls below a predetermined level,
- for each channel, determining a second parameter value of said wavelength selective optical element relative to said nominal value at which the power of said channel output from said wavelength selective optical element falls below said predetermined level,
- for each channel determining the mean of said first and second parameter values, and
- for each channel, utilising said mean as said predetermined channel variance value (IVn).

13. A method as claimed in claim 9, including utilising said difference values (Dn) to adjust a wavelength influencing parameter of said wavelength selective element.

14. A method as claimed in claim 9, including for each channel utilising said difference value (Dn) to correct the wavelength launched by said optical transmission means.

15. A wavelength control arrangement for controlling the wavelengths of channels utilised in an optical WDM link including
- a wavelength selective element (50) for receiving a combined optical signal including a plurality of optical channels launched by optical transmission means (10, 110) and adapted to separate at least two optical channels according to wavelength,
- monitoring means (60, 70) for detecting optical signals on said channels output from said wavelength selective element (50), and
- means for regulating a wavelength influencing parameter (90) associated with said wavelength selective element (50) for regulating the wavelengths selected by said wavelength selective element, characterised by
- control means (100) arranged to communicate with said means for regulating (90) and said monitoring means (70) and adapted to determine a mean parameter value for said wavelength selective element (50) said mean parameter value being the mean of parameter values determined for each channel relative to a starting parameter value of said wavelength selective element (50) at which the output power of said channels is a maximum,
- to determine a wavelength drift on the basis of said mean parameter value, and
- to generate at least one control signal for rectifying wavelength as a function of said determined wavelength drift.

16. An arrangement as claimed in claim 15, characterised in that said control means (100) are adapted to determine two parameter values associated with said wavelength selective element (50) for each channel at which the output power of said channel falls below a predetermined level.

17. An arrangement as claimed in claim 15, characterised in that said control means (100) comprise processing means for determining the magnitude and source of said wavelength drift.

18. An arrangement as claimed in claim 15, characterised in that said wavelength selective element (50) is an arrayed waveguide grating (AWG).

19. An arrangement as claimed in claim 15, characterised in that said control means (100) are adapted to communicate with said optical transmission means (10) to alter the launched wavelength using said at least one control signal.

20. An arrangement as claimed in claim 15, characterised in that a regulator (130) associated with a laser (110) in said transmission means (10) is adapted to vary a wavelength influencing parameter of said laser (110) in response to at least one control signal from said control means (100).

21. An arrangement as claimed in claim 15, characterised in that said regulating means (90) are adapted to vary said parameter of said wavelength selective element (50) in response to at least one control signal from said control means (100).

22. An arrangement as claimed in claim 15, characterised in that said control means (10) are adapted to communicate with at least one of said transmission means (10) and said regulating means (90) and monitoring means (70) via a control channel 150.

23. An optical WDM link comprising a wavelength control arrangement as claimed in claim 15.

* * * * *